United States Patent
Tazoe et al.

(10) Patent No.: US 9,202,097 B2
(45) Date of Patent: Dec. 1, 2015

(54) INFORMATION PROCESSING APPARATUS, INFORMATION PROCESSING METHOD, AND COMPUTER PROGRAM PRODUCT

(71) Applicant: KABUSHIKI KAISHA TOSHIBA, Tokyo (JP)

(72) Inventors: Yusuke Tazoe, Tokyo (JP); Masahiro Sekine, Tokyo (JP); Masashi Nishiyama, Kanagawa (JP); Goh Itoh, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 14/450,486

(22) Filed: Aug. 4, 2014

(65) Prior Publication Data

US 2015/0034725 A1   Feb. 5, 2015

(30) Foreign Application Priority Data

Aug. 5, 2013   (JP) ................. 2013-162576

(51) Int. Cl.
  *G06K 7/14*   (2006.01)
  *G06K 7/10*   (2006.01)

(52) U.S. Cl.
  CPC .......... *G06K 7/1443* (2013.01); *G06K 7/10465* (2013.01)

(58) Field of Classification Search
  CPC ..................... G06K 7/1443; G06K 7/10465
  See application file for complete search history.

(56) References Cited

U.S. PATENT DOCUMENTS

| 5,616,905 A | 4/1997 | Sugiyama | |
| 2011/0290880 A1* | 12/2011 | Cai et al. | 235/437 |
| 2013/0228619 A1* | 9/2013 | Soborski | 235/437 |
| 2013/0306733 A1 | 11/2013 | Tonouchi et al. | |

FOREIGN PATENT DOCUMENTS

| JP | H07-234915 | 9/1995 |
| JP | 2011-014012 | 1/2011 |
| JP | 2013-101481 | 5/2013 |

* cited by examiner

*Primary Examiner* — Sonji Johnson
(74) *Attorney, Agent, or Firm* — Nixon & Vanderhye, P.C.

(57) ABSTRACT

According to an embodiment, an information processing apparatus includes an acquisition unit, a detection unit, an extraction unit, and a reading unit. The acquisition unit is configured to acquire an input image including a marker having a position detection pattern. The detection unit is configured to detect the position detection pattern using identification data used for detecting the position detection pattern included in the input image, the identification data being from a plurality of position detection patterns having different forms from each other. The extraction unit is configured to extract, from the input image, the marker corresponding to the detected position detection pattern. The reading unit is configured to read data associated with the extracted marker.

10 Claims, 8 Drawing Sheets

| NUMBER OF PIECES OF DATA | SIZE | DISTANCE TO CAMERA | TOTAL |
|---|---|---|---|
| 4 | 15 mm SQUARE<br>20 mm SQUARE<br>30 mm SQUARE<br>40 mm SQUARE | FROM 15 (cm) TO 50 (cm) BY 5 cm STEP | 128 SAMPLES |

US 9,202,097 B2

INFORMATION PROCESSING APPARATUS, INFORMATION PROCESSING METHOD, AND COMPUTER PROGRAM PRODUCT

CROSS-REFERENCE TO RELATED APPLICATION

This application is based upon and claims the benefit of priority from Japanese Patent Application No. 2013-162576, filed on Aug. 5, 2013; the entire contents of which are incorporated herein by reference.

FIELD

Embodiments described herein relate generally to an information processing apparatus, an information processing method, and an information processing program.

BACKGROUND

One-dimensional markers and two-dimensional markers (e.g., QR code (registered trademark)) are widely used in information processing systems as rapid and inexpensive means for reading information. Along with the popularization of mobile terminals, various techniques have been developed for reading information stored in the markers.

For example, a technique is known that recognizes a marker included in an image by combining straight lines obtained by edge detection. When the recognition fails, the recognition processing repeats until the marker is successfully recognized by reusing the combination results of the multiple straight lines. Another technique is used that recognizes a marker on the basis of a ruled-based system using color information about an image. In the technique, ID stored in the marker is recognized as follows: a binarized input image is further subjected to blurring processing, an area that includes more than a certain rate of black pixels and satisfies the feature of the marker is set as a marker area, and information on enumeration of white segments or black segments is estimated from white-and-black information in the area to regenerate the marker and recognize the ID.

It is difficult for the conventional technique, however, to detect the edges when the marker is small or the marker is imaged at a far distance from the marker because position detection patterns included in the marker of an image become small. Furthermore, noises increase due to an imaged background and thus the position detection patterns fail to be detected. As a result, the location of the marker fails to be found in the image.

DETAILED DESCRIPTION

Figure 1:
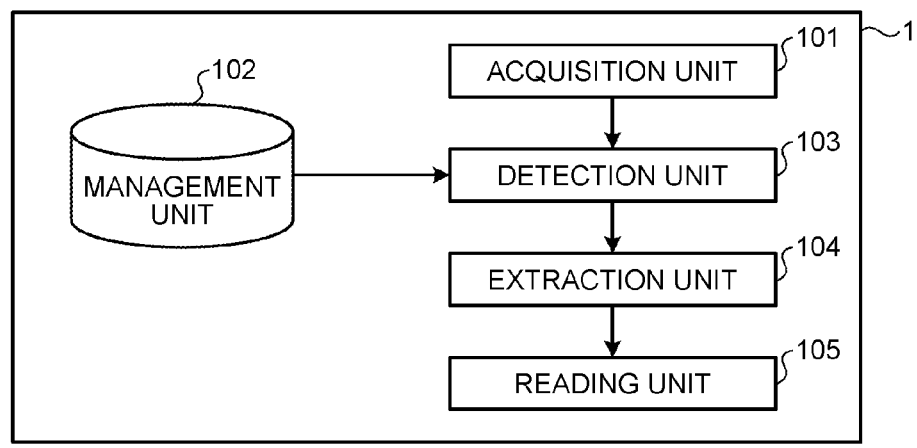
FIG. 1 is a block diagram illustrating an information processing apparatus according to a first embodiment.

According to an embodiment, an information processing apparatus includes an acquisition unit, a detection unit, an extraction unit, and a reading unit. The acquisition unit is configured to acquire an input image including a marker having a position detection pattern. The detection unit is configured to detect the position detection pattern using identification data used for detecting the position detection pattern included in the input image, the identification data being from a plurality of position detection patterns having different forms from each other. The extraction unit is configured to extract, from the input image, the marker corresponding to the detected position detection pattern. The reading unit is configured to read data associated with the extracted marker.

First Embodiment

The following describes a first embodiment with reference to the accompanying drawings. An information processing apparatus 1 in the first embodiment reads data associated with at least one marker that has position detection patterns and is included in an input image. For example, the marker may be a QR code (registered trademark). The position detection patterns may be finder patterns included in the QR code (registered trademark). The first embodiment can increase detection accuracy of the position of the marker in the image when at least one marker having the position detection patterns is small or the marker is imaged at a far distance from the marker, for example. Depending on the imaging environment of the marker, the first embodiment can also optimize identification data used for detecting the position of the marker such that accuracy of the detection is a maximum under the user's environment by changing the data stored in a storage unit of the identification data.

The information processing apparatus 1 detects the position detection patterns from an input image including at least one marker having the position detection patterns. The information processing apparatus 1 detects the position detection patterns using the identification data generated from a plurality of position detection patterns having different shapes and sizes. The identification data is used for identifying whether the position detection patters are included in the input image. For example, the identification data may be generated using the multiple position detection patterns having different forms such as shapes and sizes. In addition to the shape and the size, another factor such as a color strength may be used as the factor of the different forms. The information processing apparatus 1 extracts an area of the marker corresponding to the detected position detection patterns from the input image using the detected identification data. The information processing apparatus 1 reads data from the extracted area of the marker. As a result, the information processing apparatus 1 can detect the position of the marker with high accuracy even if the position detection patterns included in the input image are small or the marker is imaged at a far distance from the marker.

The marker in the embodiment can play a role of the position detection pattern. The marker may be any marker including specific symbols, characters, or numerals. For example, the marker may be a one-dimensional marker such as an EAN-8 or a two-dimensional marker such as a Data Matrix.

FIG. 1 is a block diagram illustrating the information processing apparatus 1. The information processing apparatus 1 reads at least one marker having the position detection patterns from an input image. The information processing apparatus 1 includes an acquisition unit 101, a management unit 102, a detection unit 103, an extraction unit 104, and a reading unit 105. The acquisition unit 101 acquires an input image by imaging an object using a camera, for example. The management unit 102 stores therein the identification data. The detection unit 103 refers to the management unit 102 and detects the positions of the position detection patterns included in the input image. The extraction unit 104 extracts, from the input image, the area of the marker corresponding to the detected position detection patterns. The reading unit 105 reads the data associated with the marker from the extracted area of the marker. In the embodiment, the management unit 102 is included in the information processing apparatus 1. The management unit 102 may be included in a terminal or a server separated from the information processing apparatus 1, and communication and processing of data may be performed through a network. The management unit 102 may be a classifier using a learning algorithm such as a support vector machine (SVM) or an adaptive boosting (AdaBoost).

Figure 2:
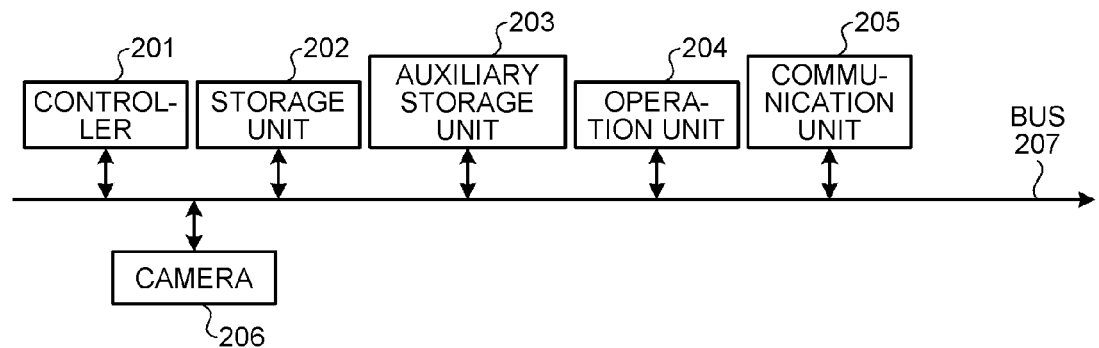
FIG. 2 is a hardware structural diagram of the information processing apparatus in the first embodiment.

FIG. 2 is a block diagram illustrating a hardware structure of the information processing apparatus 1. As illustrated in FIG. 2, the information processing apparatus 1 has hardware using a typical computer. The information processing apparatus 1 includes a controller 201 that controls the whole of the apparatus, such as a central processing unit (CPU), a storage unit 202 that stores therein various types of data and various programs, such as a read only memory (ROM) or a random access memory (RAM), an auxiliary storage unit 203 that stores therein various types of data and various programs, such as a hard disk drive (HDD) or a compact disc (CD) drive, an operation unit 204 that receives instruction input from a user, such as a keyboard or a mouse, a communication unit 205 that controls communication with an external apparatus, a camera 206 that takes an image including at least one marker having the position detection patterns, and a bus 207 that connects these units to each other.

In such a hardware structure, the controller 201 executes the various programs stored in the storage unit 202 such as a ROM or the auxiliary storage unit 203, thereby achieving the following functions. The respective units may be achieved by software written in programs or by hardware such as an electronic circuit.

Figure 3:
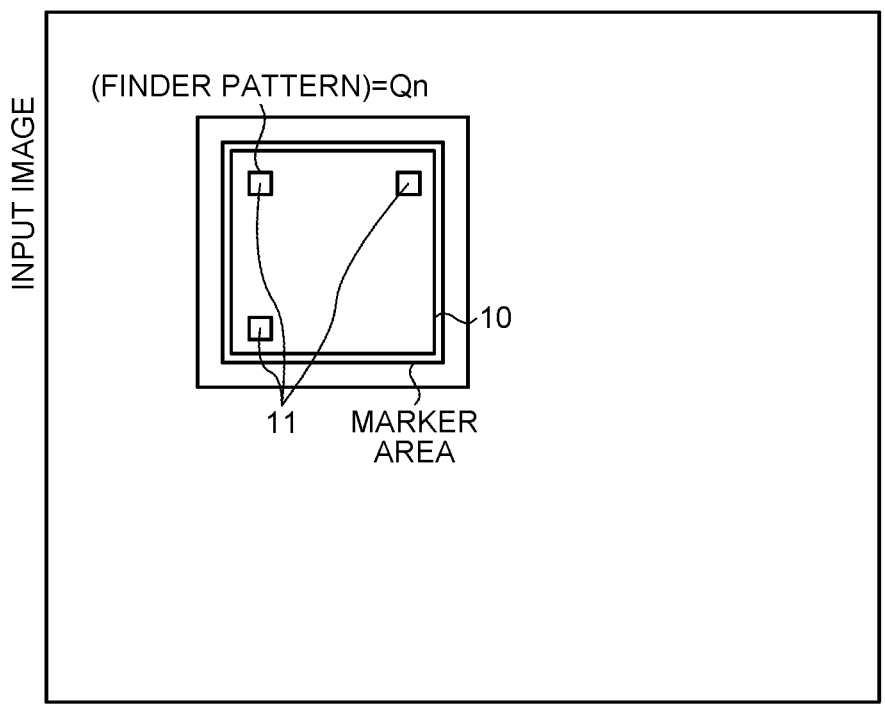
FIG. 3 is an exemplary schematic diagram of an acquired input image in the first embodiment.

The acquisition unit 101 acquires the input image taken by the camera 206. The input image includes at least one marker having the position detection patterns. FIG. 3 is an exemplary schematic diagram of the input image. The input image illustrated in FIG. 3 is the image of a sheet on which a marker 10 (a QR code (registered trademark)) is printed, which is taken by the camera 206. The marker 10 includes three position detection patterns.

The acquisition unit 101 may acquire an input image from an external apparatus connected to the auxiliary storage unit 203 or the communication unit 205 instead of that taken by the camera 206. The identification data stored in the management unit 102 includes correct images and incorrect images. The correct image is used for recognizing an area including the position detection pattern in the input image as the position detection pattern. The correct image is obtained from a part of combined images in which computer graphic (CG) images of a plurality of position detection patterns having different shapes and sizes and a plurality of background images including no position detection pattern are combined. The correct image includes more than a certain rate of the position detection pattern included in the combined image. The rate of the position detection pattern included in the correct image may be set to any value (e.g., 0.6 or 0.7).

The incorrect image is used for recognizing an area including no position detection pattern in the image. The incorrect images are obtained from the background images. It is preferable that images including straight line edges that are readily and strongly emphasized are selected as the background images used for generating the incorrect images. Alternatively, images that readily provide large difference values of feature amounts with respect to the correct images, e.g., images having different spatial frequencies from those of the correct images, may be used as the background images.

Block images that are cut as the correct images and the incorrect images and used for the identification data each have a square shape having an aspect ratio of 1:1. The size of the image may be set to any size (e.g., 16×16). A pixel step width of the image and perturbation widths of patch starting positions in the horizontal and the vertical directions are set when the block image is cut. The pixel step width and the perturbation width may be set to any value (e.g., two).

The image size, the pixel step width, the perturbation width are set to the same values for each of the block images cut as the correct images and the incorrect images used for the identification data.

The detection unit 103 refers to the management unit 102 and detects the position detection patterns included in the input image. Specifically, the detection unit 103 searches all of the areas of the input image, which is acquired by the acquisition unit 101 and includes at least one marker having the position detection patterns, using the identification data and detects candidate areas that are a group of areas each capable of being recognized as the position detection pattern. The extraction unit 104 calculates distances among the detected candidate areas and degrees of similarity between the detected candidate areas, and groups the detected candidate areas on the basis of the calculated center-to-center distances of the position detection patterns, for example. The extraction unit 104 determines that the areas excluded from the group as excessively detected areas and excludes them as those that are not position detection patterns. The center-to-center distance among the areas is used as the distance, for example. In the grouping based on the center-to-center distance, the candidate areas having a certain range of the center-to-center distance from each other are grouped into one group and the other candidate areas are excluded.

The extraction unit 104 extracts, from the input image, the area of the marker (also referred to as the marker area) corresponding to the position detection patterns detected by the detection unit 103. When two or more markers are included in the input image, the detection unit 103 calculates the center-to-center distances of the markers that are grouped and generated. When the center-to-center distance between the markers is equal to or larger than a certain distance, the makers are determined as different markers from each other. The marker areas are thus acquired for the respective markers. The reading unit 105 reads data from the area extracted by the extraction unit 104. The image sent to the reading unit 105 is obtained by cutting the area extracted by the extraction unit 104. A way to read data included in the marker included in the area extracted by the extraction unit 104 may be determined by a user appropriately. For example, data is read from the information on color enumeration based on binary code processing.

Figure 4:
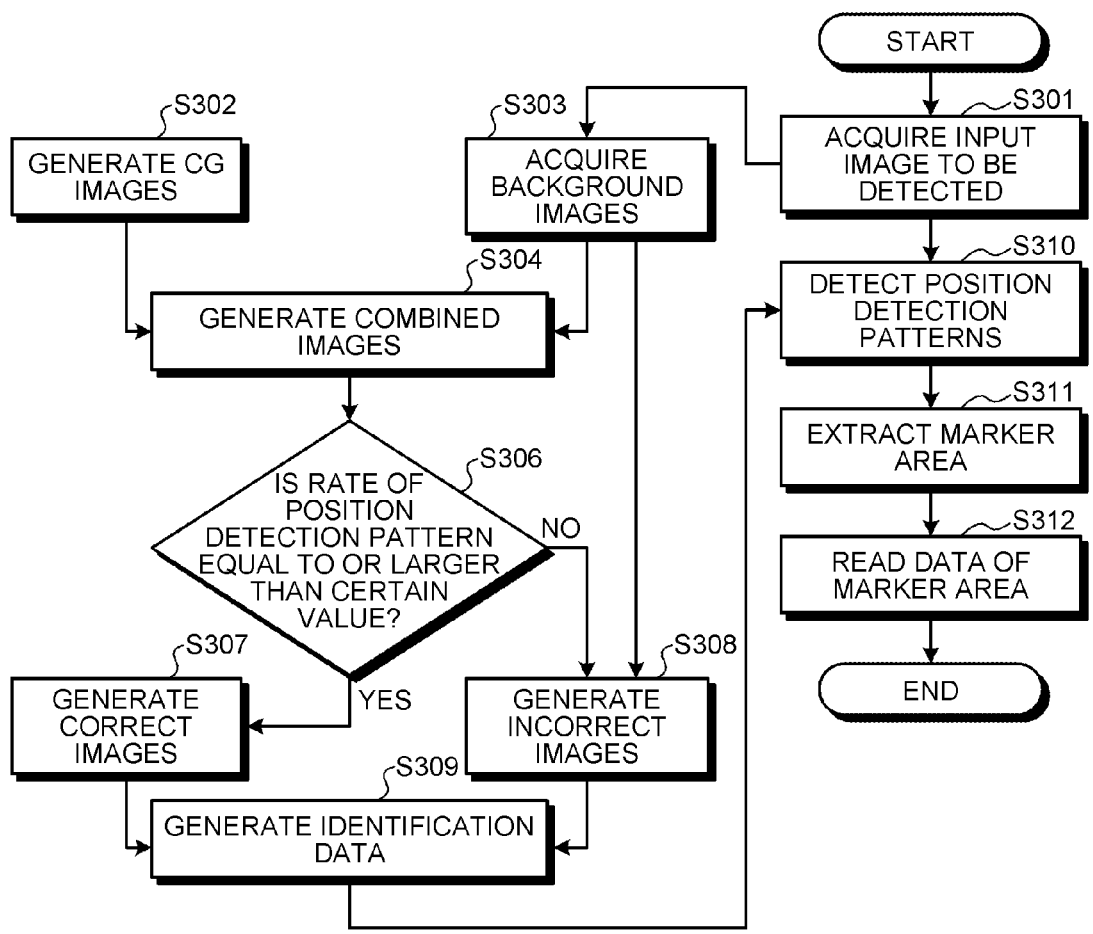
FIG. 4 is a flowchart of marker detection processing performed by the information processing apparatus in the first embodiment.
Figure 5:
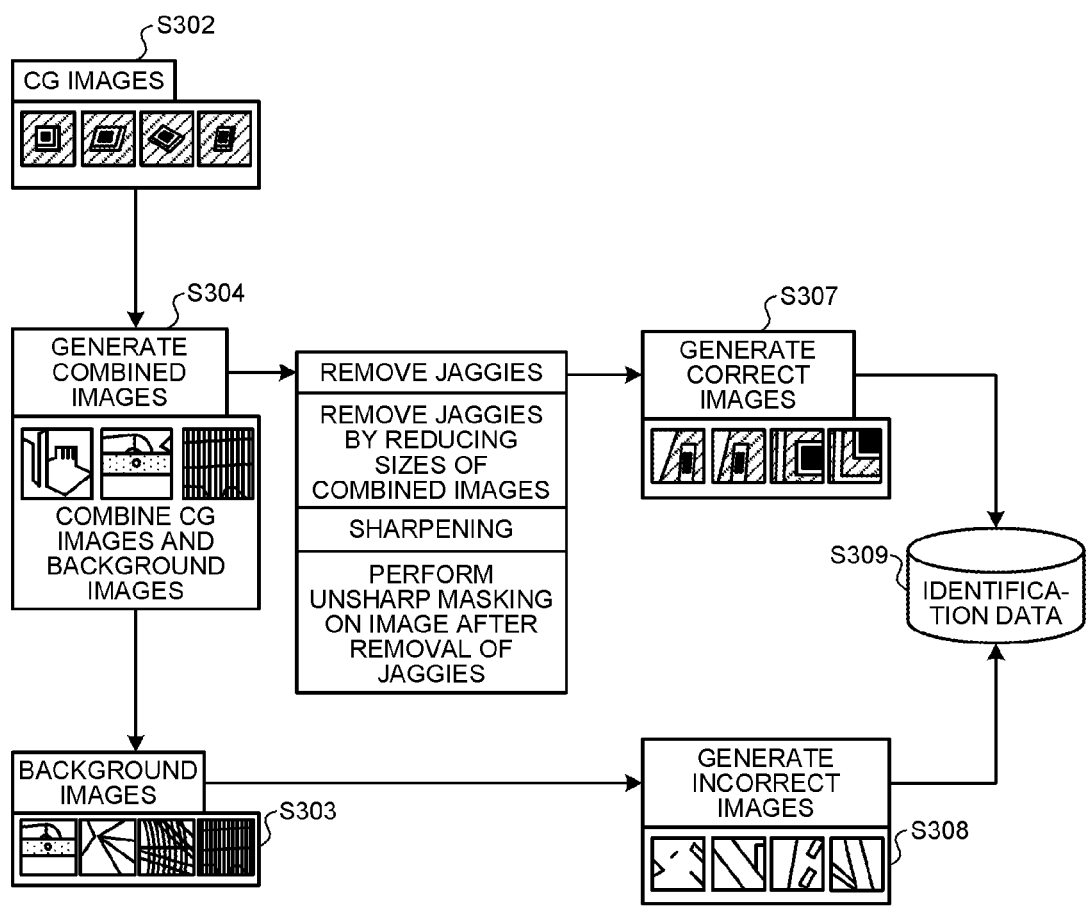
FIG. 5 is a schematic diagram illustrating generated forms of various types of data stored in a management unit.

The following describes the processing performed by the information processing apparatus in the embodiment with reference to the flowchart in FIG. 4. FIG. 5 is a schematic diagram illustrating the forms of the respective images generated from the CG images and the background images. First, the acquisition unit 101 acquires an input image to be analyzed (step S301). The input image includes at least one marker having the position detection patterns. The input image may be acquired from the camera 206 as the captured image or may be acquired from an external apparatus connected to the auxiliary storage unit 203 or the communication unit 205.

The processing from step S302 onward is performed concurrently with the processing performed by the acquisition unit 101. The processing from step S302 to step S308, in which the correct images and incorrect images are generated by the management unit 102, is performed every certain period. The management unit 102 generates the CG images of a plurality of position detection patterns having different shapes and sizes as illustrated in FIG. 5 and stores therein the generated CG images (step S302). The CG images are RGB color images having three channels. The management unit 102 generates the CG images having multiple forms from the image data of one image detection pattern, for example.

The management unit 102 acquires a plurality of background images including no position detection pattern from the input image and stores therein the acquired background images (step S303). Images including straight line edges that are readily and strongly emphasized may be selected as the background images. Alternatively, images that readily provide large difference values of feature amounts with respect to the correct images, e.g., images having different spatial frequencies from those of the correct images, may be selected as the background images.

The management unit 102 generates the combined images in which the CG images of the multiple position detection patterns having different shapes and sizes and the multiple background images including no position detection patterns are combined, and stores therein the generated combined images (step S304). The combined images may be subjected to processing in which the sizes of the images are reduced so as to remove jaggies or processing in which unsharp masking is performed on the images after the removal of the jaggies so as to sharpen the images. The management unit 102 determines the rate of the position detection pattern included in the generated combined images. The management unit 102 determines that the combined image having a rate of the position detection pattern equal to or larger than a certain threshold is the correct image and determines that the combined image having a rate of the position detection pattern smaller than the threshold is the incorrect image (step S306). The correct image is the block image obtained by cutting a part of the combined images such that the position detection pattern is included at a rate equal to or larger than a certain rate. As an example of ways to cut the block image, a way can be employed in which the block image is slid in the combined images having three channels while calculating the rate of the position detection pattern in the block image. The block image is a rectangular image having an aspect of 1:1. The size of the image may be set to any size (e.g., 16×16). A rate x of the position detection pattern included in the combined image is calculated as a rate of the area of the position detection pattern to the total area of the combined image. Let a threshold for determining the correct image be $th_2$ and a threshold for determining the incorrect image be $th_1$ ($th_1$ and $th_2$ are integers larger than zero and equal to or smaller than one), the determination whether the combined image is the correct image or the incorrect image can be done as follows.

The combined image is determined as the incorrect image where $0<x<th_1$. The combined image is determined as the correct image where $th_2 \le x \le 1$. The combined image is erased where $th_1 \le x < th_2$. The same value may be set to $th_1$ and $th_2$.

When the block image is cut, the pixel step width of the image and the perturbation widths of the patch starting positions in the horizontal and the vertical directions are set. The pixel step width and the perturbation width may be set to any value (e.g., "2").

The management unit 102 generates the correct images by combining the block images having a rate of the position detection pattern equal to or larger than a certain value and the multiple background images including no position detection pattern (step S307). The management unit 102 also generates the incorrect images from the multiple background images including no position detection pattern and the combined images having a rate of the position detection pattern smaller than a certain threshold (step S308). The incorrect images are the block images obtained by cutting a part of the background images. The incorrect image includes no position detection pattern or the position detection pattern with a rate smaller than a certain threshold. The size of the block image and the way to cut the block image are respectively set to the same value and in the manner as those for the correct images generated at step S307.

The management unit 102 generates the identification data for identifying the position detection patterns included in the input image acquired at step S301 using the correct images, the incorrect images, and validation data of the correct images, and the validation data of the incorrect images (step S309). In the production of the identification data, the maximum number of features may be set to any value (e.g., "100"). A maximum error detection rate and a minimum correct detection rate may be set to any value (e.g., "0.65" and "0.95", respectively).

The following describes the processing from step S310 onward. The detection unit 103 detects the position detection patterns included in the input image acquired at step S301 using the identification data generated at step S309 (step S310). Specifically, the detection unit 103 extracts the candidate areas of the position detection pattern, calculates the center-to-center distances among the extracted candidate areas, and performs clustering on the basis of the calculated center-to-center distances among the candidate areas. The detection unit 103 determines that the areas excluded from the cluster as the excessively detected areas and excludes them as those that are not the position detection patterns.

The extraction unit 104 extracts, from the input image, the marker area corresponding to the position detection patterns detected at step S310 (step S311). When two or more markers are included in the input image, the extraction unit 104 acquires the marker areas in accordance with the number of clusters generated as a result of the clustering at step S310. The reading unit 105 reads the data of the markers from the marker areas extracted at step S311 (step S312). The way to read the data may be determined by a user appropriately. For example, the data is read from the information on color enumeration based on binary code processing of the image.

Figure 6:
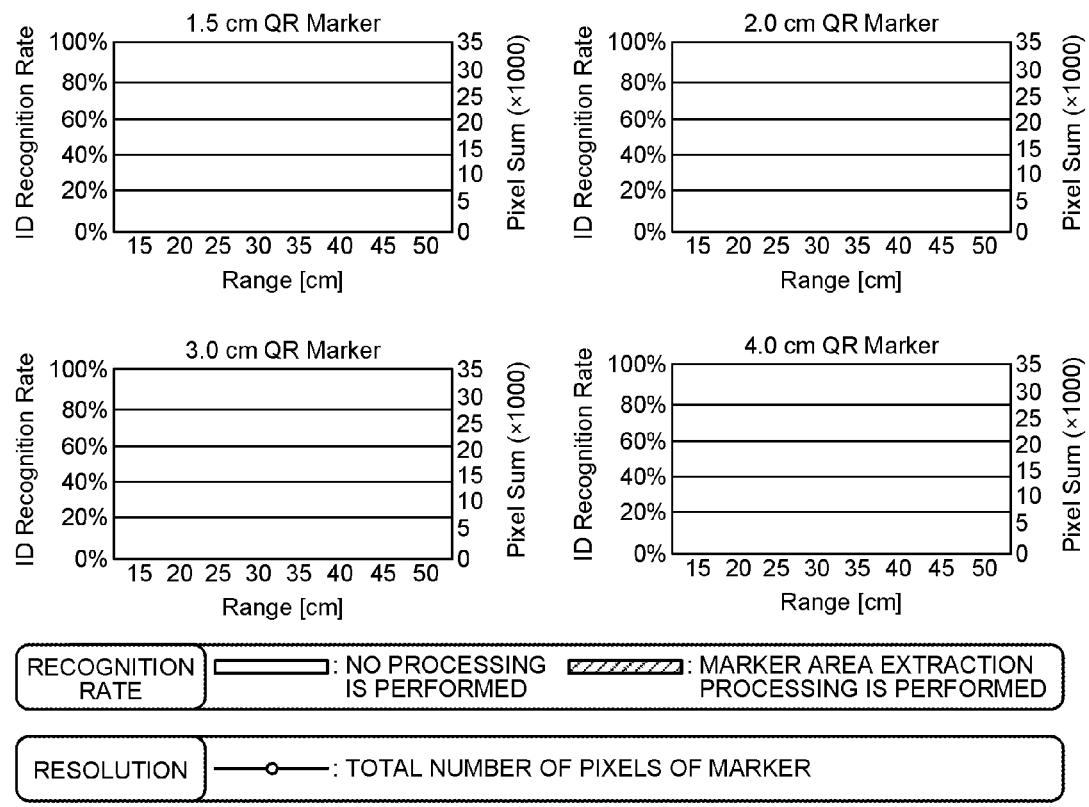
FIG. 6 is a schematic diagram illustrating effects of the information processing apparatus in the first embodiment.
Figures 7, 8:
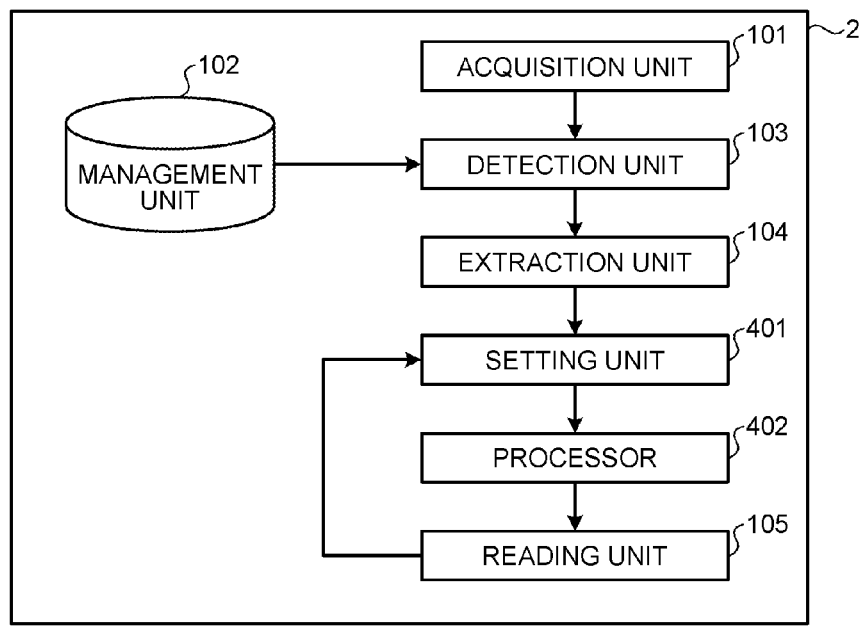
FIG. 7 is a schematic diagram illustrating a breakdown of evaluation data used for evaluating the information processing apparatus in the first embodiment.
FIG. 8 is a block diagram illustrating an information processing apparatus according to a second embodiment.

The following describes effects of the processing in the embodiment, in which the position detection patterns are detected, with reference to FIGS. 6 and 7. FIG. 6 illustrates comparison results of data read accuracy of the position detection patterns in relation to the presence or absence of the detection processing of the position detection patterns. FIG. 7 illustrates a breakdown of the data used for the evaluation. The image used for the experiment includes only one marker having the position detection patterns. In FIG. 6, the ordinate axis on the left presents the recognition rate while the abscissa axis on the right represents the total number of pixels of the marker, which is included in the image, in the image. The bar charts in FIG. 6 each represent the read accuracy in the case that the data is directly read from the input image without detecting the position detection patterns and without extracting the marker area, and the read accuracy in the case that the data is read from the marker area after the position detection patterns are detected and the marker area is extracted as described in the embodiment. The line graphs each represent the total number of pixels of the marker in the image in relation to the distance between the marker and the camera imaging the marker. Referring to FIG. 6, it is found that the recognition accuracy is further increased in the case that the position detection patterns are detected and the marker area is extracted as described in the embodiment regardless of the size of markers, i.e., the QR code (registered trademark), and the distances when the marker is imaged.

The information processing apparatus in the embodiment detects the position detection patterns from the input image including at least one marker having the position detection patterns. When detecting the position detection patterns, the information processing apparatus uses the management unit that stores the identification data that is generated from the multiple position detection patterns having different shapes and sizes, and identifies whether the position detection patterns are included in the input image. As a result, the information processing apparatus can detect the position detection patterns included in the marker in the image with reference to the management unit even if the position detection patterns are small. The information processing apparatus extracts the marker area corresponding to the detected position detection patterns from the input image and reads the data using the extracted marker area, thereby making it possible to remove noises due to the imaged background and increase the read accuracy.

Second Embodiment

The following describes an information processing apparatus 2 according to a second embodiment. In the following description, the same components as those of the first embodiment are labeled with the same reference numerals and the duplicated descriptions thereof are omitted. FIG. 8 is a block diagram illustrating the information processing apparatus 2. The information processing apparatus 2 further includes a setting unit 401 and a processor 402 in addition to the structure of the information processing apparatus 1. The information processing apparatus 2 can use the same hardware structure as the information processing apparatus 1 in the first embodiment.

The setting unit 401 sets, in accordance with the resolution of the marker area extracted by the extraction unit 104 from the input image, sharpness and resolution of the marker area such that data embedded in the marker included in the input image can be read. The sharpness set by the setting unit 401 is strength of unsharp masking performed on the marker area extracted by the extraction unit 104. A value 128 of the parameter corresponds to one implementation of the unsharp masking. The value of the strength of the unsharp masking may be set to any value (e.g., 256). When the setting unit 401 sets the resolution, the processor 402 calculates a magnification ratio indicating that how many times the marker area is magnified by comparing the resolution of the marker area extracted by the extraction unit 104 with the set resolution. The magnification ratio may be set to any value (e.g., "2").

The processor 402 performs image processing on the marker area extracted by the extraction unit 104 using the set sharpness and resolution. Specifically, the processor 402 performs image sharpening on the marker area extracted by the extraction unit 104 using the sharpness set by the setting unit 401. The processor 402 magnifies the extracted marker area using the magnification ratio calculated from the set resolution and the resolution of the extracted marker area. When the reading unit 105 fails to read the data embedded in the marker from the marker area having different sharpness and resolution from those of the marker area extracted by the extraction unit 104, the sharpness and resolution are set again to higher values by the setting unit 401. When the reading unit 105 fails to read the data embedded in the marker, the setting unit 401 may set again the value of the sharpness to any value (e.g., "512"). When the reading unit 105 fails to read the data embedded in the marker, the setting unit 401 may set again the value of the resolution to any value (e.g., "3").

Figure 9:
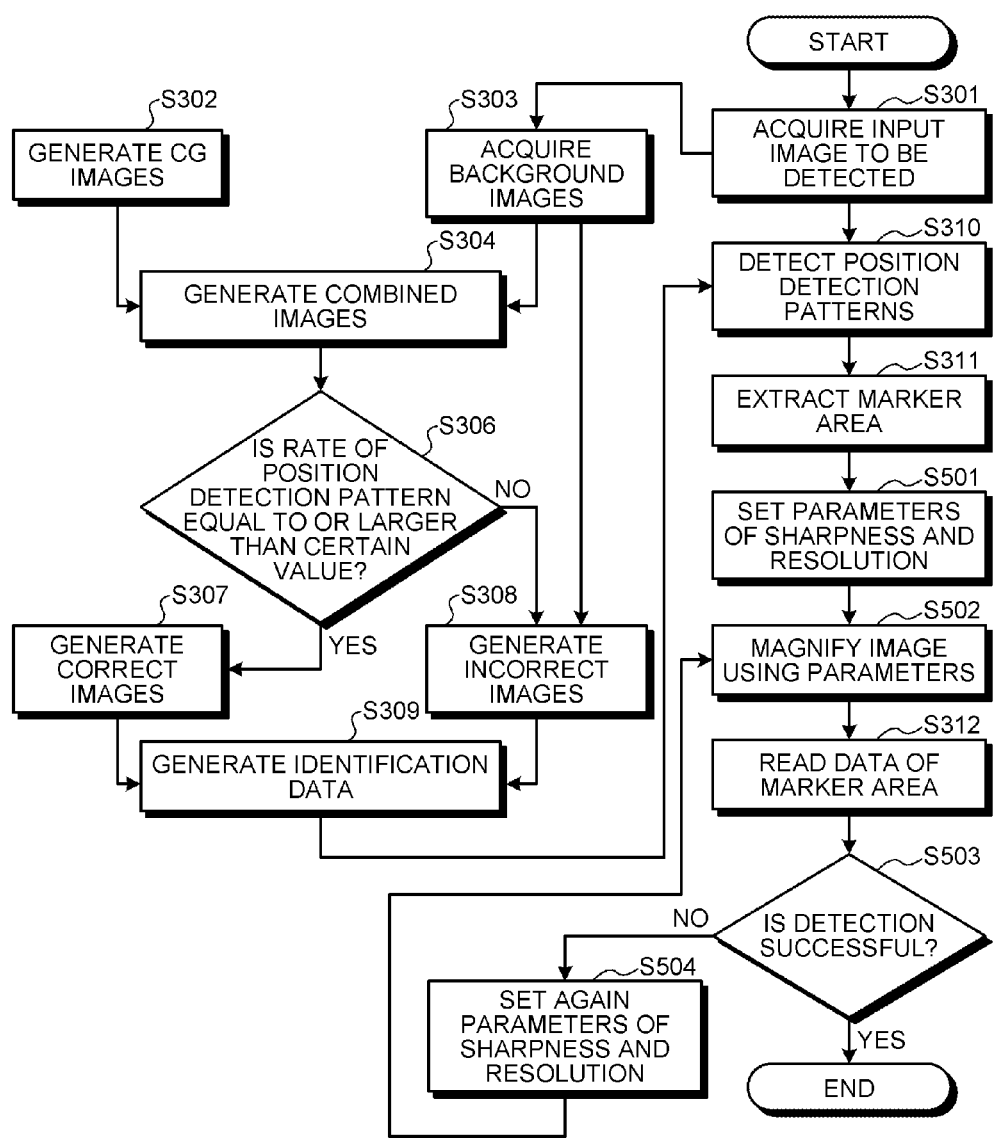
FIG. 9 is a flowchart of processing performed by the information processing apparatus in the second embodiment.

The following describes a flow of the processing in the embodiment with reference to the flowchart in FIG. 9. The processing from step S301 to step S311 is the same as that of the flowchart in FIG. 4 in the first embodiment and the description thereof is thus omitted. When the extraction of the marker by the extraction unit 104 is completed, the setting unit 401 sets, in accordance with the resolution of the extracted area of the marker included in the input image, the sharpness and the resolution of the marker area such that the data embedded in the marker can be read (step S501). The sharpness represents the strength of the unsharp masking. The strength when the value of the parameter is 128 corresponds to "one" implementation of the unsharp masking. The value of the strength of the unsharp masking may be set to any value (e.g., "256").

At step S502, the processor 402 sharpens the image of and magnifies the size of the marker area extracted at step S311 using the sharpness and the resolution set at step S501. The reading unit 105 reads the data of the marker from the marker area, which is extracted and subjected to sharpening and magnification with changed settings (step S312). The reading unit 105 determines whether the embedded data is read and detected from the marker included in the input image (step S503). If the data is read (Yes at step S503), the processing ends.

If no data is read (No at step S503), the processing proceeds to step S504. The setting unit 401 sets again the sharpness and the resolution to higher values such that the data embedded in the marker included in the image can be read (step S504).

After the values of the sharpness and the resolution are set again, the processing proceeds to step S502. The values of the sharpness and the resolution set again differ from those initially set. Any values may be set as long as this condition is satisfied.

Figure 10:
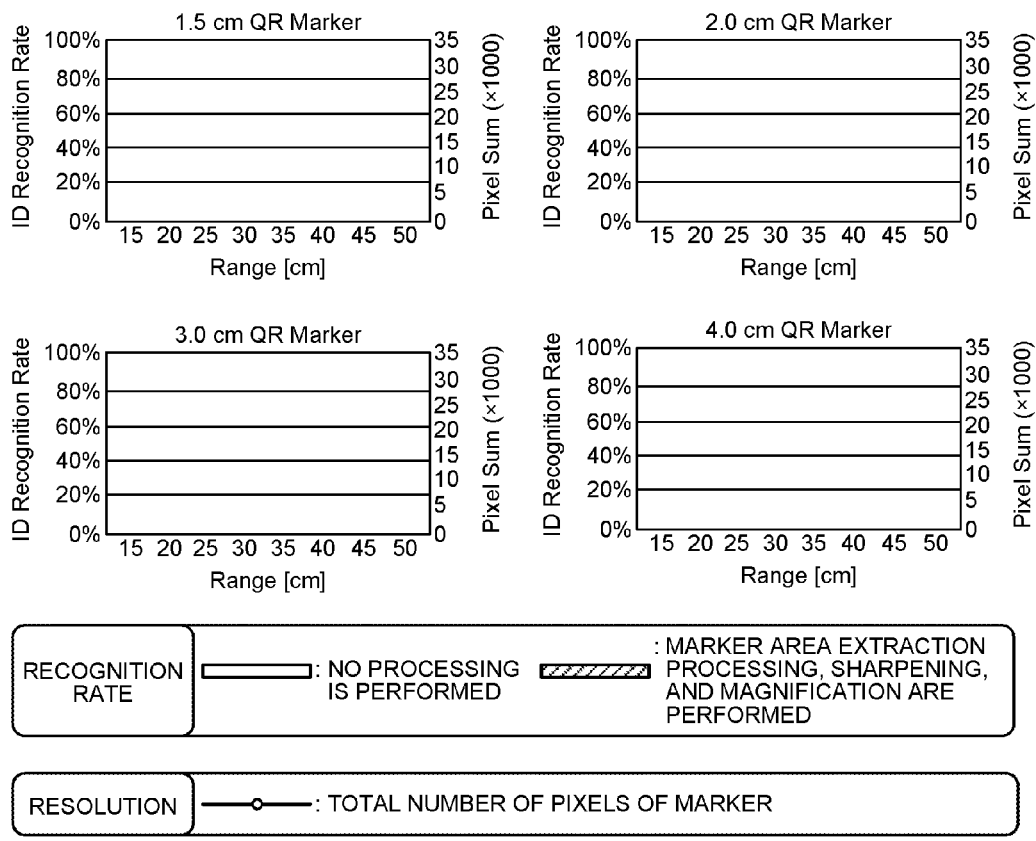
FIG. 10 is a schematic diagram illustrating effects of the information processing apparatus in the second embodiment.

FIG. 10 illustrates comparison results of data read accuracy of the position detection patterns in relation to whether the second embodiment is applied to the processing. In FIG. 10, the ordinate axis on the left presents the recognition rate while the abscissa axis on the right represents the total number of pixels of the marker, which is included in the image, in the image. The bar charts in FIG. 10 each illustrate the read accuracy in the case that the data is directly read from the input image without detecting the position detection patterns, extracting the marker area, and performing the sharpening and image magnification, and in the case that the data is read from the marker area after the position detection patterns are detected, the marker area is extracted, and the sharpening and image magnification are performed on the extracted marker area as described in the second embodiment. The line graphs each represent the total number of pixels of the marker in the image in relation to the distance between the marker and the camera imaging the marker. As illustrated in FIG. 10, it can be found that the information processing apparatus 2 further increases the read accuracy than that of the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a processor that
acquires an input image including a marker having a position detection pattern;
detects the position detection pattern using identification data for detecting the position detection pattern included in the input image, the identification data being from a plurality of position detection patterns having different forms from each other;
extracts, from the input image, the marker corresponding to the detected position detection pattern;
reads data associated with the extracted marker; and
generates a correct image from a combined image in which pieces of image data of the position detection patterns having different forms and a plurality of background images not including the position detection pattern are combined, stores the generated correct image, generates an incorrect image from the background images not including the position detection pattern, and stores the generated incorrect image,
wherein the identification data includes the correct image and the incorrect image, and a position of the position detection pattern included in the input image is detected using the correct image and the incorrect image.

2. The apparatus according to claim 1, wherein the processor determines as the correct image the combined image having a rate of the position detection pattern equal to or larger than a threshold, and determines as the incorrect image the combined image having a rate of the position detection pattern smaller than the threshold.

3. The apparatus according to claim 1, wherein the processor further
searches the input image using the identification data to detect candidate areas of the position detection pattern, and
groups the candidate areas on the basis of distances between the candidate areas, recognizes the grouped candidate areas as the position detection pattern, and excludes the candidate areas that are not grouped.

4. The apparatus according to claim 3, wherein
the input image includes two or more markers, and
the processor determines whether the markers are identical to each other on the basis of center-to-center distances of the grouped candidate areas.

5. The apparatus according to claim 1, wherein the processor further:

sets sharpness or resolution of the marker to a higher value as the resolution of the marker extracted by the extraction unit decreases; and
performs image processing on the marker using the set sharpness and resolution,
wherein the processor further reads the identification data from the marker on which the image processing is performed.

6. The apparatus according to claim 5, wherein the processor sets at least one of the sharpness and the resolution of the marker to a higher value when the processor fails to read the identification data.

7. The apparatus according to claim 5, wherein the sharpness is strength of unsharp masking of the image.

8. The apparatus according to claim 5, wherein the processor magnifies the marker with such a magnification ratio that the resolution of the whole of the grouped candidate areas of the position detection pattern becomes the set resolution.

9. An information processing method comprising:
acquiring, by a processor, an input image including a marker having a position detection pattern;
detecting, by the processor, the position detection pattern included in the input image using identification data for detecting the position detection pattern included in the input image, the identification data being generated from a plurality of position detection patterns having different forms from each other;
extracting, by the processor, from the input image, the marker corresponding to the detected position detection pattern; and
reading, by the processor, data associated with the extracted marker;
generating, by the processor, a correct image from a combined image in which pieces of image data of the position detection patterns having different forms and a plurality of background images not including the position detection pattern are combined;
storing, by the processor, the generated correct image;
generating, by the processor, an incorrect image from the background images not including the position detection pattern; and
storing, by the processor, the generated incorrect image,
wherein the identification data includes the correct image and the incorrect image, and a position of the position detection pattern included in the input image is detected using the correct image and the incorrect image.

10. A computer program product comprising a non-transitory computer-readable medium containing a program which, when executed by a computer, causes the computer to execute at least:
acquiring an input image including a marker having a position detection pattern;
detecting the position detection pattern included in the input image using identification data for detecting the position detection pattern included in the input image, the identification data being generated from a plurality of position detection patterns having different forms from each other;
extracting, from the input image, the marker corresponding to the detected position detection pattern; and
reading data associated with the extracted marker;
generating a correct image from a combined image in which pieces of image data of the position detection patterns having different forms and a plurality of background images not including the position detection pattern are combined;
storing the generated correct image;

generating an incorrect image from the background images not including the position detection pattern; and
storing the generated incorrect image,
wherein the identification data includes the correct image and the incorrect image, and a position of the position detection pattern included in the input image is detected using the correct image and the incorrect image.

\* \* \* \* \*